Oct. 7, 1969      J. L. VANNEST      3,471,208
POSITIVE ALIGNMENT FEATURE FOR SPLIT RING BEARING RETAINERS
Filed Oct. 9, 1967

INVENTOR.
JAMES L. VANNEST
BY
Hopgood & Calimafde
ATTORNEYS

United States Patent Office 3,471,208
Patented Oct. 7, 1969

3,471,208
POSITIVE ALIGNMENT FEATURE FOR SPLIT
RING BEARING RETAINERS
James L. Vannest, New Britain, Conn., assignor, by mesne
assignments, to Textron, Inc., Providence, R.I., a corporation of Delaware
Filed Oct. 9, 1967, Ser. No. 673,733
Int. Cl. F16c *19/20, 33/38*
U.S. Cl. 308—201                                      8 Claims

ABSTRACT OF THE DISCLOSURE

A split antifriction bearing retainer ring incorporates tongue-and-groove mating asymmetric to the bearing axis, to provide positive and unique alignment and prevent rotational misalignment upon assembly. Axial grooves are cut into one ring, and the mating surface of the other ring is conformed to said grooves to achieve a custom fit.

---

Background

The invention is in the field of bearing cages for elements of antifriction bearings. More particularly, the invention relates to the structure and manufacture of split-ring bearing cages, and is directed to retaining the halves of such cages in precise alignment during and after manufacture and assembly.

Split-ring cages of the prior art have exhibited a tendency for the two halves thereof to rotate out of alignment with one another, thereby distorting the retaining pockets. This distortion can occur during the drilling of the pockets and rivet holes, during assembly, or during operation of the completed bearing under rotational stress. This invention solves these problems through an effectively keyed engagement of the retainer halves, the keyed engagement being asymmetrical with respect to the bearing axis, so as to assure precise angular alignment and function, to resist rotational misalignment of the annular elements of the cage, and to assure unambiguous reassembly, as after inspection and service of bearing parts.

An object of the invention is to provide a means for positively retaining fixed angular alignment and radial register between the halves of a split-ring cage while the bearing pockets are being drilled therein.

A further object is to provide bearing retainer with means for assuring precise angular and radial alignment following disassembly, utilizing asymmetrical elements such that annular parts of the cage can be fitted together in only one unique angular relation.

A still further objective is to provide a bearing-cage construction characterized by added reisistance to operating forces which act to skew the separate halves of bearing pockets. It is also an object to meet the foregoing objects with a structure in which solid retainer body metal of the same retainer half provides ball-retaining support at both 180°-spaced contact points for any given ball as viewed in the radial plane of ball centers.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 2:
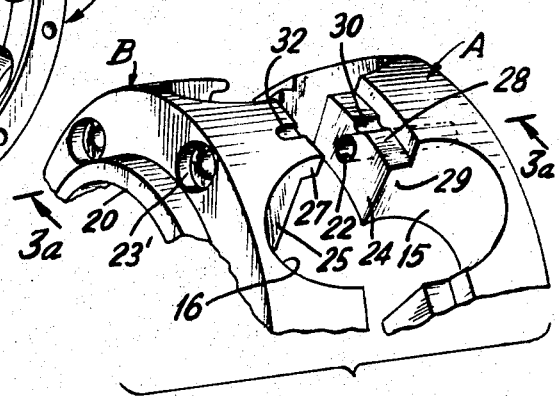
FIG. 2 is an enlarged fragmentary exploded perspective view of matched portions of separate halves of the retainer of FIG. 1, illustrating part of the key means of the invention.
Figure 3A:
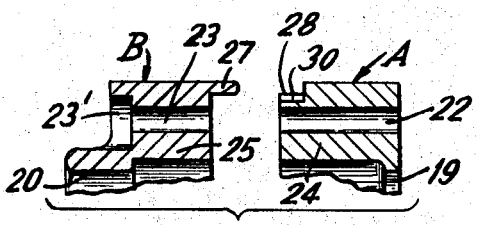
Figure 3B:
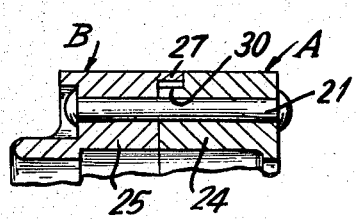
Figure 3C:
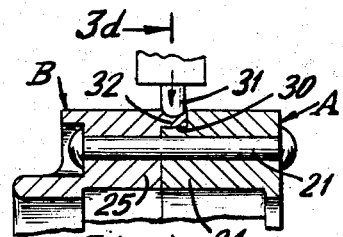
Figure 4:
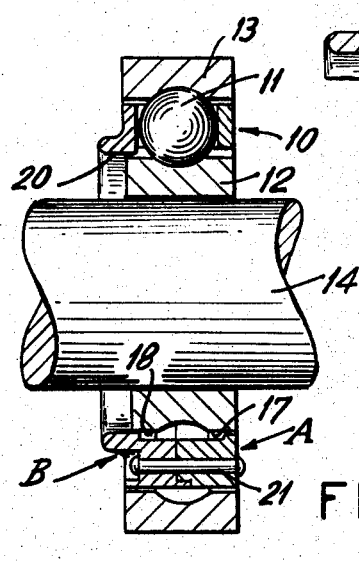
Figure 3D:
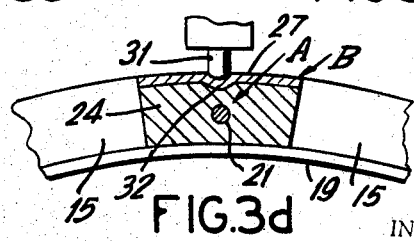

FIGS. 3a, b and c are fragmentary sectional views, in generally the plane 3a—3a of FIG. 2, illustrating successive steps in mating the two halves of the retainer, according to the method of the invention;

FIG. 3d is a fragmentary sectional view, partly broken-away and sectioned generally in the plane 3d—3d of FIG. 3c; and FIG. 4 is a longitudinal sectional view of an assembled ball bearing using my retainer.

Referring to the drawings, the invention is shown in application to a split-ring retainer 10 for angularly spacing the balls 11 of an antifriction bearing in which the balls run in raceways forming part of inner and outer rings 12–13, the inner ring being mounted on a shaft 14. The retainer may be of malleable metal such as mild steel or a non-ferrous material, coated, as with silver plate, to minimize friction at ball contact.

Figure 1:
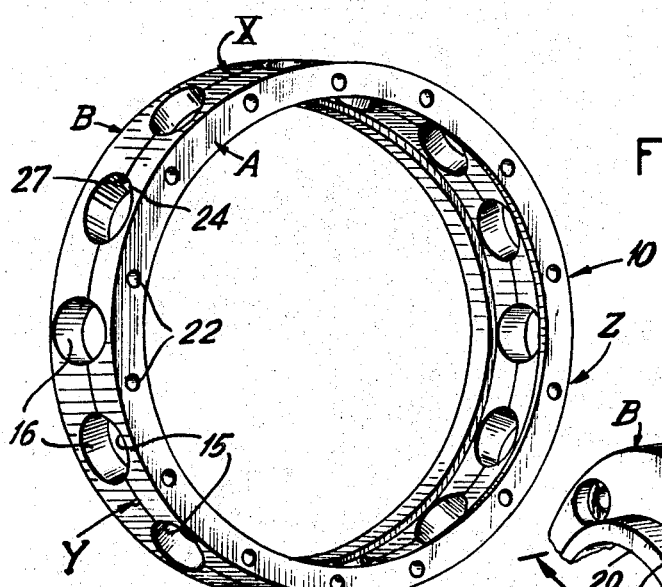
FIG. 1 is a perspective view of an assembled split-ring retainer for a radial ball bearing incorporating the invention.

The retainer 10 of the invention comprises essentially two mating halves A–B, shown fitted together in the perspective of FIG. 1. Spaced ball pockets are defined by matching semi-cylindrical recesses at the fit of halves A–B, these recesses being identified at 15 for the A half and at 16 for the B half. Piloting on the lands 17–18 of inner ring 12 is effected at spaced flange elements 19–20 formed integrally with the respective halves A–B so as to define a circumferentially continuous lubricant-retaining region adjacent each axial lip or edges of the inner raceway.

When assembled, axially extending retaining rivets or pins 21 pass through aligned bores 22–23 in the abutting body parts or bridges 24–25 between ball pockets, and the outer face of the retainer half B is shown counter-bored at 23' for the blind reception of rivet heads.

Radial matching of the halves A–B is assured by a telescoping interfit of the arcuate flange or lip elements 27 of bridges 25 concentrically riding the corresponding arcuate lands 28 of bridges 24. The axial overlap of these parts 27–28 preferably straddles the radial plane of ball centers, and the radial extent of bridges 24 (retainer half A) in this region of overlap is sufficient to assure ball contact in this radial plane only on the sides of bridges 24, i.e. to the exclusion of such contact with bridges 25; such contact is generally indicated by the dot 29 in FIG. 2 for one direction of a given ball motion, it being understood that similar contact with the other lateral faces of bridges 24 will apply for the opposite direction of ball motion. Stated in other words, the described structure assures that all ball-to-retainer contacts in the stated radial plane are directly sustained by retainer half A, at opposite faces of bridges 24, spaced 180° apart, in terms of each ball center.

Of course, this stated condition applies for by far the greatest number of ball-to-pocket contacts. However, in operation and under load, other parts of the ball pockets are called upon to sustain ball contact, including some contact with the other retainer half B, at its pocket recesses 16. The individual concentric match of pocket recesses 15 with their other halves is achievable if each bore 15–16 is made as an individual machining operation on a clamped assembly of the two retainer halves, and if the angular match of the retainer halves is never thereafter lost or losable. In accordance with the invention, such match is unambiguously preserved by an asymmetrical keyed interfit of the halves A–B.

The keyed interfit, in the form shown, involves provision of like axially extending recesses 30 in the lands 28 over which flanges 27 ride. Flanges 27 are of sufficient radial thickness to be locally radially deformable, yet thick enough to retain such deformation under handling and operating conditions. Deformation of flange 27 is shown performed by a radially reciprocated staking tool 31 (FIGS. 3c and 3d) after damping the halves A–B by means of bolts or rivets 21, the parts being shown in FIG. 3b just prior to deformation. Deformation is local, being in large part determined by the recess 30 into which part of flange 27 is fully driven, to form the key 32.

In order that the invention function according to its concept, no rotational movement between the halves of the retainer should be possible after the key element 32 has been staked into keyway 30. This condition is accomplished when a substantial portion of groove 30 is filled by the deformation 32 in lip 27.

To provide asymmetry in the registration of keyed engagements 32–30, the keys 32 are struck at asymmetrically spaced bridge-abutment locations. For example, for the 14-ball configuration shown in FIG. 1, key deformations 32 may be made at the three bridge locations designated generally X–Y–Z, it being noted that in such case, three unkeyed bridges are interposed between keyed bridges at X–Y, four bridges at Y–Z, and four bridges are interposed between keyed bridges at Z–X. Alternatively, for further example, it will be understood that the deformations 32 may be struck at all but one of the bridge locations, or on of the key grooves or recesses 30 may be wider than the others, thus assuring the desired asymmetry of keyed engagement.

The described keying will be seen to match the halves A–B only for their initially formed angular relation. The initial keying, in conjunction with initial clamping by bolts or rivets 21, assures that pocket boring (e.g. drilling or milling) can be clean and true; it also assures against angular shift of halves A–B when the bearing is in use. If necessary or desired, the halves A–B may thereafter be separated as for plating or chemical treatment, or for inspection and refinishing; and final assembly can be correct and unambiguous. This result is achieved without adversely affecting or compromising the inherent ability of only one-half (A) to sustain the preponderance of ball-to-retainer contacts.

While the principles of the invention have been described in connection with the above specific apparatus, it is to be clearly understood that this description is made only by way of example and not as a limitation on the scope of the invention.

What is claimed is:

1. A split antifriction bearing cage comprising:
   two mating annular elements having mating faces which overlap in stepped relationship creating a mutual lateral surface assuring precise radial register therebetween, at least one keyway in a mating face of one of said elements,
   and at least one key-like ridge on a mating face of the other of said elements which complements said keyway and rides therein in close interfering relationship when said two mating elements are placed together to form said cage, said ridge comprising a lateral deformation formed by pressing an overlapping portion of said other element into said keyway, and when the mating faces of said two mating annular elements overlap in stepped relationship to form said cage said elements remain in precise angular alignment,
   and said complementary key-like ridge comprises a lateral deformation formed by pressing the opposing face of said other mating element into said keyway.

2. The bearing cage of claim 1 wherein said complementary key and keyway structures are asymmetrically arranged upon said annular mating elements such that said elements will fit together in a single disposition.

3. A split antifriction bearing cage comprising:
   first and second mating annular elements having annular mating faces which laterally overlap,
   a step cut from the other periphery and a plurality of axial grooves in the underlying annular surface of said first element,
   and a plurality of axial ridges in the overlying annular surface of said second element complementary to said axial grooves and riding therein when said two mating elements are placed together to form said cage.

4. A split antifriction bearing cage comprising:
   two mating annular elements having mating faces which laterally overlap,
   the mating face of a first of said elements having a step cut from the outer periphery thereof, and the second of said elements having a complementary lip fitting into said step formed by cutting a complementary step in the inner periphery of the mating face thereof,
   a plurality of axial grooves in the underlying surface of said first element,
   and a plurality of axial ridges in the overlying surface of said second element complementary to said axial grooves and riding therein when said two mating elements are placed together to form said cage.
   wherein said lateral overlap comprises a first annular step cut into the outer periphery of the mating face of the first of said annular mating elements, and a complementary overlapping lip fitting into said step formed by cutting a second and complementary annular step into the inner periphery of the mating face of the other of said annular mating elements.

5. The device of claim 4 wherein said grooves are milled into the lateral surface of said first annular step and said axial ridges are formed by pressing said lip into said grooves with said mating elements assembled.

6. An antifriction bearing cage comprised of
   a plurality of mating annular elements, said elements having complementary mating surfaces, which overlap successively in stepped relationship creating mutual lateral surfaces respectively therebetween,
   each of the inner of said mating surfaces having a step cut from the outer periphery thereof and an asymmetrical keyway arrangement therein, and
   each of the outer of said mating surfaces being pressed into said keyways so as to resist angular displacement between said elements and enable reassembly in unique angular alignment.

7. A split antifriction bearing retainer comprising:
   two mating annular halves having corresponding angularly spaced matching ball-receiving recesses at their adjacent axial sides,
   said recesses defining mating bridge elements between recesses, the bridge elements of one of said halves having arcuate circumferential flange elements and the bridge elements of the other of said halves having arcuate circumferential land elements for axially telescoping overlap and support of the fit between said halves,
   each of said lands having a keying groove formed therein in said region of overlap,
   axially extending means clamping bridge elements of said halves at angularly spaced locations, and
   an array of local key formations in an asymmetrically distributed plurality of said flange elements extending into keyed registry with the adjacent keying groove.

8. A retainer according to claim 7, wherein the region of axial overlap straddles the radial plane of ball-pocket centers, and wherein the radial thickness of bridge body beneath the land radius radially straddles the locus of ball radii retained in said pockets, whereby only one-half of said retainer is relied upon to sustain the vast preponderance of ball-to-retainer contacts.

References Cited

UNITED STATES PATENTS

| | | | |
|---|---|---|---|
| 3,011,841 | 12/1961 | Moyer et al. | 308—217 |
| 3,172,710 | 3/1965 | Altson | 308—217 |
| 1,911,544 | 5/1933 | Beard | 308—217 |

FOREIGN PATENTS

| | | |
|---|---|---|
| 1,385,568 | 12/1964 | France. |
| 22,260 | 4/1911 | Great Britain. |

MARTIN P. SCHWADRON, Primary Examiner

F. SUSKO, Assistant Examiner